(No Model.)

J. G. PARSONS.
VEHICLE SPRING.

No. 320,389. Patented June 16, 1885.

Witnesses:
E. G. Asmus
R. Platz

Inventor:
John G. Parsons
By Stout & Underwood
Attorneys.

UNITED STATES PATENT OFFICE.

JOHN G. PARSONS, OF CINCINNATI, OHIO.

VEHICLE-SPRING.

SPECIFICATION forming part of Letters Patent No. 320,389, dated June 16, 1885.

Application filed July 31, 1884. (No model.)

*To all whom it may concern:*

Be it known that I, JOHN G. PARSONS, of Cincinnati, in the county of Hamilton, and in the State of Ohio, have invented certain new and useful Improvements in Vehicle-Springs; and I do hereby declare that the following is a full, clear, and exact description thereof.

My invention relates to carriage-springs, and will be fully described hereinafter.

Figure 1:
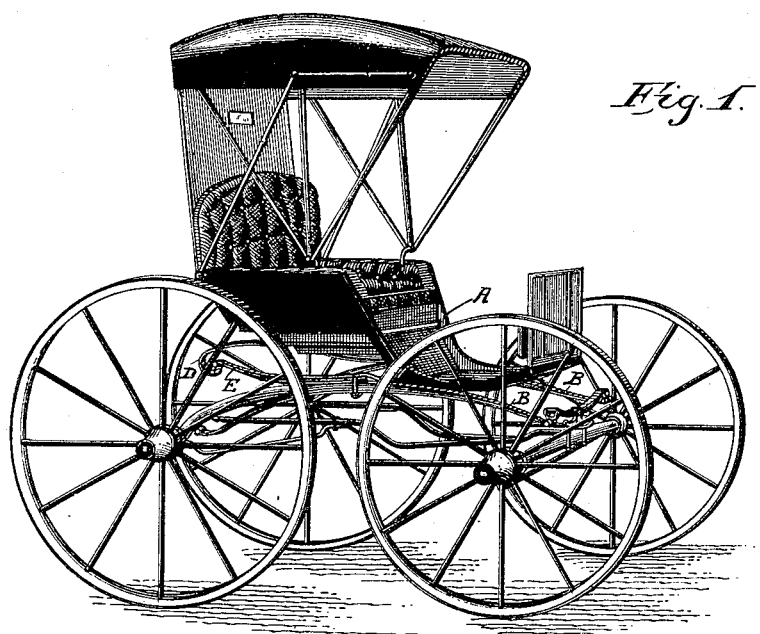
Figure 2:
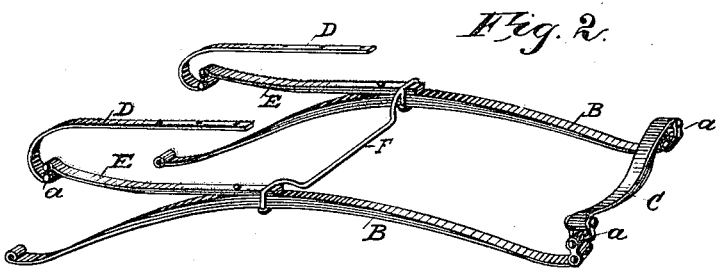

In the drawings, Figure 1 is a perspective view of a phaeton embodying my invention; and Fig. 2 is a like view enlarged, with the wheels and top removed.

A is the body. B are ordinary semi elliptic side springs, and C the ordinary front springs. D is a body-loop, and E is a half semi-elliptic spring, which is attached at one end to the center of the side spring while its other end extends rearward at an acute angle to the side spring and is shackled to the rear end of the body-loop by link $a$. The body is supported in front by a cross-bar, F. This arrangement of springs, while it admits of hanging the body low down, is equally sensitive to light or heavy loads, and is therefore particularly adapted for phaetons.

What I claim as my invention, and desire to secure by Letters Patent, is—

1. In a vehicle, the ordinary side springs in combination with a half semi-elliptic spring, E, secured to each side spring at or near its center and each shackled to a body-loop and a cross-bar, F, the springs E being in vertical line with the side springs and their front ends resting thereon, and the cross-bar F extending from the center of one side spring to the center of the other at a horizontal plane lower than that of the centers of said side springs, as set forth.

2. In a vehicle, the ordinary springs B, half semi-elliptic springs E, body-loop, and shackle, in combination with the front spring, C, as set forth.

In testimony that I claim the foregoing I have hereunto set my hand, at Milwaukee, in the county of Milwaukee and State of Wisconsin, in the presence of two witnesses.

JOHN G. PARSONS.

Witnesses:
S. S. STOUT,
H. J. FORSYTHE.